United States Patent [19]

Draft

[11] E Patent Number: Re. 33,555

[45] Reissued Date of Patent: Mar. 19, 1991

[54] TANK OVERFILL VALVE

[76] Inventor: Roger A. Draft, 14627 Boom Rd., Spring Lake, Mich. 49456

[21] Appl. No.: 349,862

[22] Filed: May 10, 1989

Related U.S. Patent Documents

Reissue of:

[64] Patent No.: 4,667,711
Issued: May 26, 1987
Appl. No.: 811,825
Filed: Dec. 20, 1985

U.S. Applications:

[63] Continuation-in-part of Ser. No. 608,871, May 10, 1984, abandoned.

[51] Int. Cl.[5] ..... F16K 21/18; F16K 31/18

[52] U.S. Cl. ..... 141/198; 137/227; 137/448; 137/434; 141/213; 141/216

[58] Field of Search ..... 141/192, 198–206, 141/211–216, 220–225, 229, 303, 392; 137/448, 416, 434, 527, 527.8, 315, 513.3, 409, 435, 436, 441, 446

[56] References Cited

U.S. PATENT DOCUMENTS

| | | | |
|---|---|---|---|
| 979,819 | 12/1910 | Anderson | 141/199 |
| 1,219,222 | 3/1917 | Baxter et al. | 137/390 |
| 1,246,033 | 11/1917 | Adams | 141/199 |
| 1,268,947 | 6/1918 | Fell | 141/199 |
| 1,289,490 | 12/1918 | Lundstrom | 141/199 |
| 1,313,386 | 8/1919 | Jones | 141/199 |
| 1,689,066 | 10/1928 | Baxter | 141/220 |
| 1,978,314 | 10/1934 | Lancaster | 220/86 R |
| 2,340,936 | 2/1944 | Cook | 220/86 R |
| 2,464,456 | 3/1949 | McGillis et al. . | |
| 2,499,409 | 3/1950 | Norway | 137/441 |
| 2,569,110 | 9/1951 | McGillis et al. . | |
| 2,685,891 | 8/1954 | Segelhorst | 137/513.3 |
| 2,705,372 | 4/1955 | Cornell | 33/729 X |
| 2,811,179 | 10/1957 | Greenwood | 141/95 |
| 2,918,931 | 12/1959 | Siri | 137/448 |
| 2,918,932 | 12/1959 | Few | 137/448 |
| 3,078,867 | 2/1963 | McGillis et al. | 137/448 |
| 3,610,273 | 10/1971 | Russell | 137/513.3 |
| 3,661,175 | 5/1972 | Tillman | 137/513.3 |
| 3,791,407 | 2/1974 | Nicholls | 137/513.3 |
| 3,794,077 | 2/1974 | Fanishier | 137/513.3 |
| 3,963,041 | 6/1976 | McGillis | 141/198 |
| 4,331,185 | 5/1982 | Rinaldo et al. | 141/95 |
| 4,396,034 | 9/1983 | Cherniak | 137/527.8 |
| 4,407,325 | 8/1983 | Cherniak | 137/527.8 |
| 4,469,118 | 9/1984 | Hansen | 141/213 |

FOREIGN PATENT DOCUMENTS

| | | | |
|---|---|---|---|
| 312320 | 4/1989 | European Pat. Off. | 137/409 |
| 7534409 | 6/1964 | France | 141/198 |
| 1526790 | 5/1968 | France . | |
| 2327469 | 5/1977 | France . | |
| 1360869 | 6/1977 | France . | |
| 2355736 | 1/1978 | France . | |
| 2299264 | 8/1978 | France . | |
| 1444260 | 7/1976 | United Kingdom . | |
| 1531083 | 11/1978 | United Kingdom . | |
| 89/11446 | 11/1987 | World Int. Prop. O. . | |

*Primary Examiner*—Ernest G. Cusick
*Attorney, Agent, or Firm*—Price, Heneveld, Cooper, DeWitt & Litton

[57] ABSTRACT

An overfill valve having a saddle-shaped, flapper valve element located within an inlet pipe and a mating valve seat disposed about the inner wall of the pipe. A spring couples a weighted float to the valve element and extends generally outward from the pipe. The float moves the valve element from a normally open position to a closed position as the float is raised. A controlled drain aperture through the valve element permits standing fluid within the pipe to drain. The spring allows the float to be moved to permit the pipe to be slid down a storage tank casing. A triggering mechanism is coupled to the float and valve element so that the float shifts a triggering element into the liquid flow through the valve, and the force of liquid flow against the triggering element forces the valve element toward the closed position.

63 Claims, 4 Drawing Sheets

TANK OVERFILL VALVE

Matter enclosed in heavy brackets [ ] appears in the original patent but forms no part of this reissue specification; matter printed in italics indicates the additions made by reissue.

This is a continuation-in-part of application Ser. No. 608,871, filed May 10, 1984, now abandoned.

BACKGROUND OF THE INVENTION

The present invention relates to tank overfill valves, and in particular to overfill valves for tanks used in the storage of toxic or flammable liquids such as those common to automotive service stations and the like.

A large number of toxic or flammable liquid storage tanks are in use today, one common use being the storage of gasoline or diesel fuel in underground tanks. Such liquid storage tanks are normally provided with an upright casing by which the tank is filed. In conventional installations in which the tank is buried, this casing runs from the tank up to the ground surface. A drop tube is received down the casing and is used as a fill tube for the tank. The drop tube normally extends down to about the bottom of the tank in order to reduce splashing of the product and creation of vapors when filling the tank. Two conventional methods are used as safety features that prevent vapors from collecting within the tank and pressurizing the tank as it is filled. In one, a fill hose from the supply truck is connected to the drop tube and the tank includes a separate vent outlet. The vent outlet is either connected to the supply truck by a recovery hose to recover vapors released while filling the tank or the vent vents the tank to the atmosphere. The other method uses a coaxial drop tube which is connected to the supply truck. When a tank having a coaxial drop tube is filled, a double headed valve is connected to the top of the coaxial tubes. One line from the tank supply truck is connected by the valve to the drop tube in order to introduce the liquid product and a second vapor recovery line is connected by the valve to the annular space between the casing and the drop tube. The vapors within the tank rise through the annular space and are recovered into the truck.

A common problem with such storage tanks is that the tank is often overfilled, resulting in spillage of the liquid product. Such spills present a severe health and environmental hazard in that the toxic liquid may reach the local ground water or otherwise enter into the ecosystem. The magnitude of this storage tank overfill problem is evidenced by the fact that many state and local governments are enacting regulations that require liquid storage tanks to be equipped with a device that will shut off flow to the tank when the tank is full. Although storage tank vents may be normally provided with ball float valves that raise to close the vent orifice, when the tank fills and closes the ball float valve, the tank becomes pressurized. When the fill line is disconnected this pressure forces product up out of the casing or fill pipe. Another problem is that in both the system using two separate hose connections or a single valve on a coaxial drop tube, product delivery from the truck is not halted until the tank, fill pipe and fill hose all are filled. When the fill hose is disconnected the product remaining in the hose will discharge onto the ground.

In an attempt to correct this overfilling problem devices have been developed that sound alarms or the like when the storage tank is full. However, such devices are relatively complex and expensive, and do not shut off flow to the tank. These electrical systems will fail if power is absent. Further, such devices do not readily retrofit to existing tanks.

The problem of providing an overfill shut off for liquid storage tanks, and particularly for those used by service stations, is complicated by the manner in which owners gauge whether the tank requires filling. Normally a long pole is lowered through the drop tube in order to determine the liquid level in the tank. Any shut off mechanism, such as ball float valves for tank vents, that obstruct the drop tube would prevent passage of the gauging pole and would require a different, more complex gauging system.

SUMMARY OF THE INVENTION

The present invention solves the above noted problems by the provision of a tank overfill valve that stops flow to the tank when full and which may be readily retrofit to existing storage tanks. Preferably, in one aspect the invention is embodied in an overfill valve having a pivotal flapper valve face or plate that is mounted within the lower end of a drop tube. A weighted float is connected to the flapper plate by a resilient element that permits the float to be moved out of the way while the drop tube is inserted into the tank casing.

In another aspect the flapper plate conforms to the inner wall of the tube, so that during filling of the tank the weight holds the flapper gate in a normally open position. As the tank fills and the float is lifted, the gate closes to shut off flow through the tube. Thereafter, as the tank is emptied the valve returns to its normally open condition. The flapper plate and float do not obstruct the passage through the drop tube, so that conventional gauging poles or the like may be lowered into the tank.

In another aspect the valve includes a triggering mechanism that assists in urging the valve face toward the closed position. A triggering element is shifted by the float into the flow of liquid as the tank approaches a filled condition. The triggering element is coupled to the float and valve face so that the flow of liquid against the triggering element forces the valve face toward the closed position.

DETAILED DESCRIPTION OF THE PREFERRED EMBODIMENTS EMBODIMENT OF FIGS. 1-5

Figure 1:
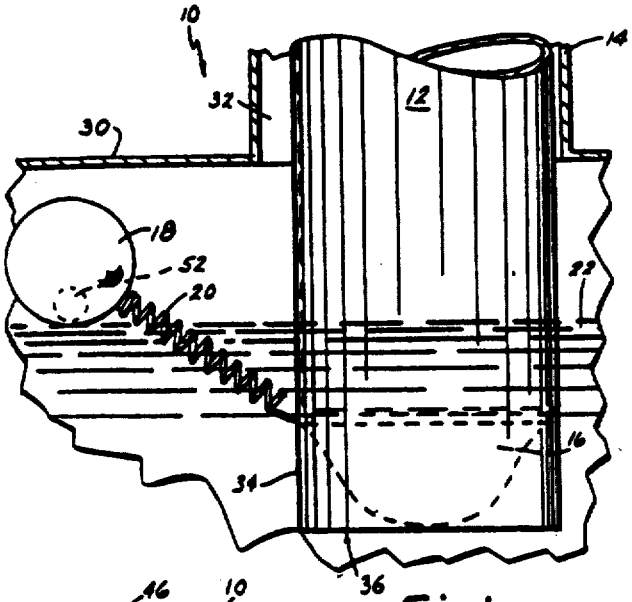
FIG. 1 is a fragmentary, front elevational view of the tank overfill valve taken through a section of the liquid storage tank, the overfill valve being shown in a closed condition.

The first preferred embodiment of a tank overfill valve in accordance with the present invention is shown in FIG. 1 and generally designated 10. As shown, a drop tube or pipe 12 extends coaxially down into a liquid storage tank casing 14. A curved plate or flapper valve element 16 is pivotally mounted in the lower end of tube 12. Tube 12, therefore, defines a housing to element 16. A weighted float 18 is connected to plate 16 by a spring 20 that forms a resilient moment arm between float 18 and plate 16. Weighted float 18 holds plate 16 in a normally open condition so that neither curved plate 16 or float 18 substantially obstructs tube 12. As the tank is filled, float 18 is raised by a fluid level 22, which ultimately causes curved plate 16 to close and substantially shut off fluid flow through tube 12. A controlled amount of leakage is permitted through drop tube 12 when overfill valve 10 is in a closed condition, so that as fluid level 22 lowers, curved plate 16 will return to its normally open position.

As shown in FIG. 1, a liquid storage tank 30 is of a conventional design used in the storage of toxic or flammable liquid materials, such as for example those used as service station underground gasoline tanks or the like. Casing 14 extends upward from the top of tank 30, and includes at its upper end a coupling (not shown) which is adapted to be mated with truck fill lines or valves. Casing 14 is also of conventional design, and in the case of service station underground storage tanks includes an upper end that is housed within a man hole (not shown). Drop tube 12 extends down through casing 14 and has an outside diameter that is less than the inside diameter of casing 14 so that an annular space 32 is formed between casing 14 and tube 12. At the upper end of tube 12 (not shown) a conventional coupling or mounting device supports tube 12 within casing 14. During the filling of tank 30 a nozzle is fitted onto the upper ends of casing 14 and tube 12. The liquid product is introduced through tube 12 and vapor is recovered through annular space 32 or a second vapor outlet (not shown).

Figure 2:
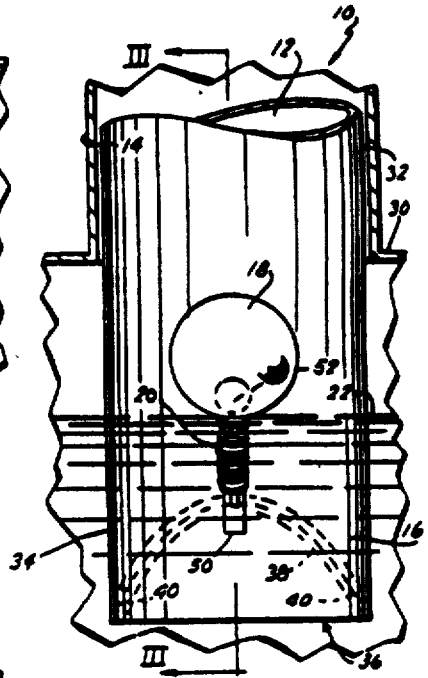
FIG. 2 is a fragmentary, side elevational view of the tank overfill valve shown in FIG. 1.
Figure 3:
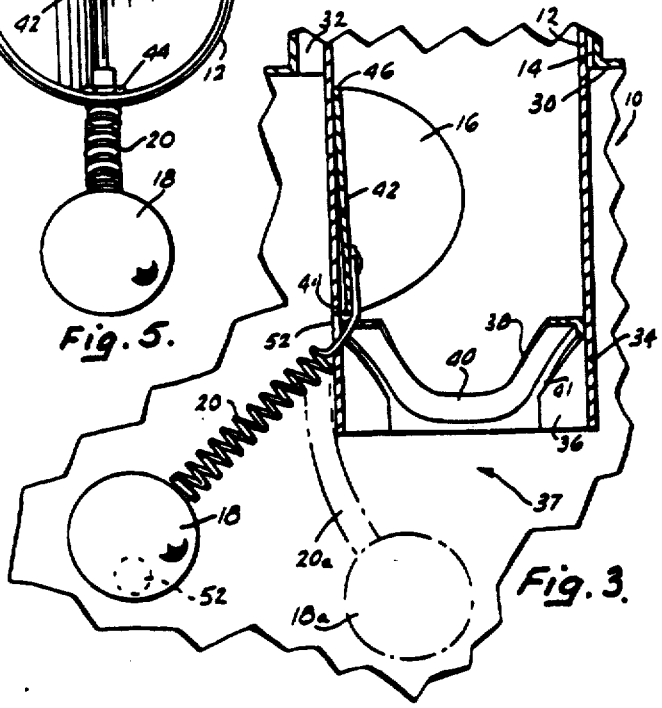
FIG. 3 is a fragmentary, sectional view of the tank overfill valve taken along plane III—III of FIG. 2, but shown with the overfill valve in an open condition and the weighted float also shown in phantom in a position for lowering down a casing.
Figure 4:
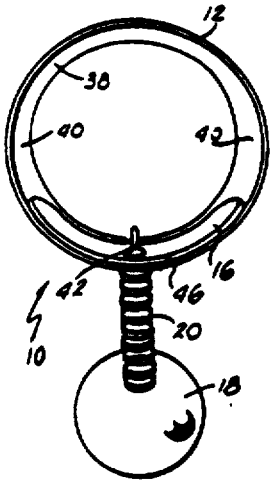
FIG. 4 is a top plan view of the tank overfill valve of FIG. 1 shown in an open condition.

Tube 12 has a lower discharge end 34 and a discharge aperture or outlet 36 that extends through tube 12 and opens through the bottom of end 34. Extending downward directly beneath outlet 36 is a discharge zone 37 through which the fluid flows from tube 12. As shown in FIGS. 2-4, along the inner wall of tube 12 at discharge end 34 is an inwardly extending flange or valve seat 38. Valve seat 38 extends about the entire inner perimeter of drop tube 12. As shown in FIG. 4, valve seat 38 is narrower on the side opposite the connection with curved plate 16 in order to reduce the flow restriction by seat 38. Seat 38 curves so as to conform to curved plate 16 and includes a curved depending portion 40 located on either side of tube 12. Valve seat 38 therefore has a "saddle-shaped" configuration that appears to be circular in plan view, FIG. 4. From a front view shown in FIG. 3, valve seat 38 has an overall U-shape, while from the side valve seat has an inverted U-shape, FIG. 2. Preferably, valve seat 38 is bent inward from a depending mounting flange 41, FIG. 3. Mounting flange 41 is used to secure valve seat 38 on the inner wall of tube 12, such as by riveting, welding or other conventional means. Alternatively, the lower end of tube 12 can be cut so as to be configured generally similar to the configuration of seat 38 and then bent inward to form valve seat 38 integrally with tube 12.

Figure 5:
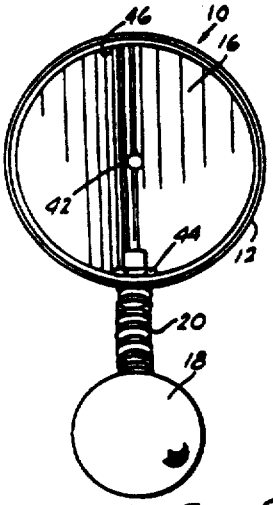
FIG. 5 is a top plan view of the tank overfill valve of FIG. 1 shown in a closed condition.

Curved plate 16 is formed from a flat sheet of metal that is cut and bent into a saddle-shape having an outer perimeter corresponding to the shape of valve seat 38. Curved flapper plate 16 therefore has an oval configuration that has been bent into an inverted "U" when viewed from the side, FIG. 2. As shown in FIG. 5, the bent oval configuration of plate 16 results in plate 16 having a circular plan view that is somewhat smaller than the inner diameter of tube 12. This curved configuration allows plate 16 to be oriented generally vertically relative to tube 12 when in an open position, FIG. 3. In an open position plate 16 will conform to and extend about a portion of the inner perimeter of tube 12 (FIG. 4) and leave aperture 36 through tube 12 generally unobstructed. Located through the center of plate 16 is a controlled drain aperture 42 (FIGS. 3-5). Alternatively, drain aperture 42 can be located through the side of tube 12 above seat 38, or may be located at the sides of plate 16 or the like such as an annular opening at a portion of the perimeter of plate 16. Aperture 42 permits liquid trapped above plate 16 to drain from tube 12 when valve 10 is in a closed condition.

A hinge 44 pivotally secures one side of plate 16 to the inner wall of tube 12, FIG. 5. As shown in FIG. 3, when plate 16 is in an open position hinge 44 spaces the bottom edge of plate 16 from tube 12 slightly, while upper edge 46 abuts the inner wall to 12. The spacing of plate 16 by hinge 44 causes fluid flowing through tube 12 to force plate upper edge 46 outward against tube 12. Fluid flow through tube 12 therefore maintains valve 10 in a normally open position.

The gap behind plate 16 when plate 16 is in an open position may be filled by building up tube 12 with a filling material This built-up area prevents fluid from backflowing off of seat 38 and up behind plate 16. The built-up portion of tube 12 would therefor prevent any backflow from forcing plate 16 away from tube 12 and prematurely closing plate 16, whether such premature closing would be due to backflow water pressure, vortex shedding or other phenomenon.

As shown in FIG. 3, spring 20 is welded or otherwise joined to plate 16 adjacent hinge 44. Spring 20 extends generally radially outward from the side of tube 12 and passes through a slot 50 (FIG. 2) in tube lower end 34. Spring 20 is preferably a coil spring, but alternatively other resilient members such as leaf springs or the like may be used. Float 18 is a conventional ball float mounted at the outermost end of spring 20. Located within float 18 is a spherical weight 52, FIGS. 1-3. When outwardly spaced by spring 20 the combined weight of ball 18 and weight 52 is sufficient to overcome the weight of plate 16 so as to pivot plate 16 about hinge 44. Plate 16 is therefore biased into a normally open position shown in FIG. 3. Spring 20 is sufficiently stiff to hold float 18 to the side of tube 12 and up out of discharge zone 37. Discharge zone 37 is therefor generally unobstructed by valve 10. However, spring 20 is sufficiently resilient to permit float 18 to be manually bent down beneath tube 12, as shown in phantom 18a and 20a in FIG. 3. With float 18a bent beneath tube 12, annular space 32 provides enough clearance to permit tube 12 to be slid axially down through casing 14 without interference from float 18a.

EMBODIMENT OF FIGS. 6-7

Figure 6:
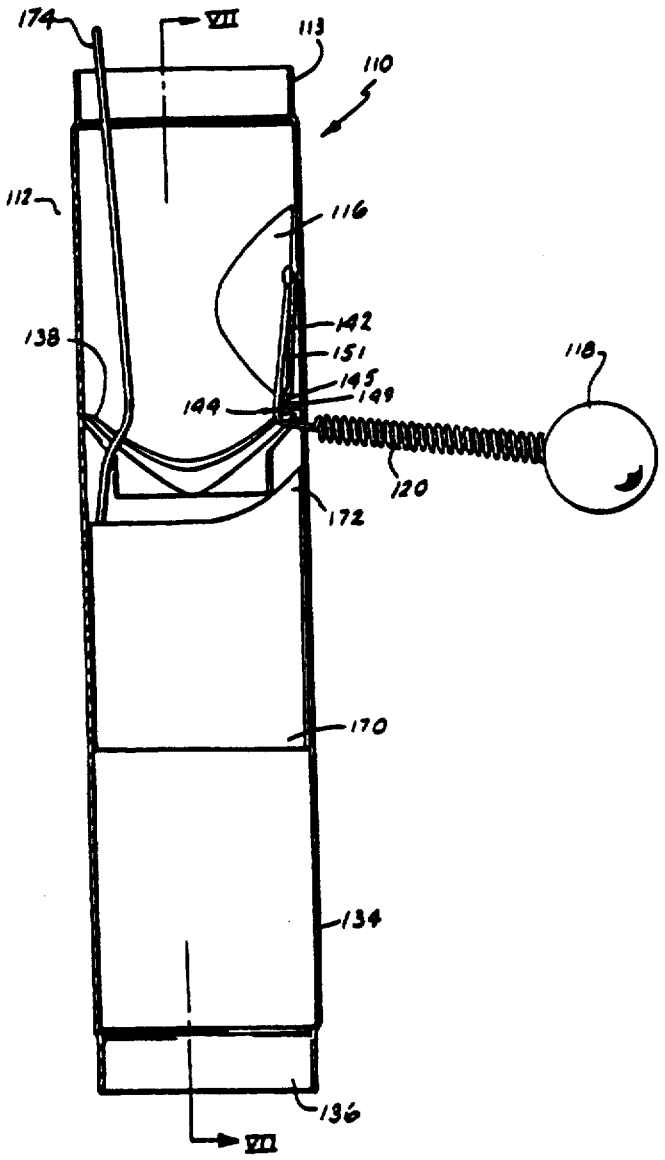
FIG. 6 is a front sectional view of another tank overfill valve forming a second preferred embodiment of the device shown with the overfill valve in an open position and the slot closing collar in a closed condition.
Figure 7:
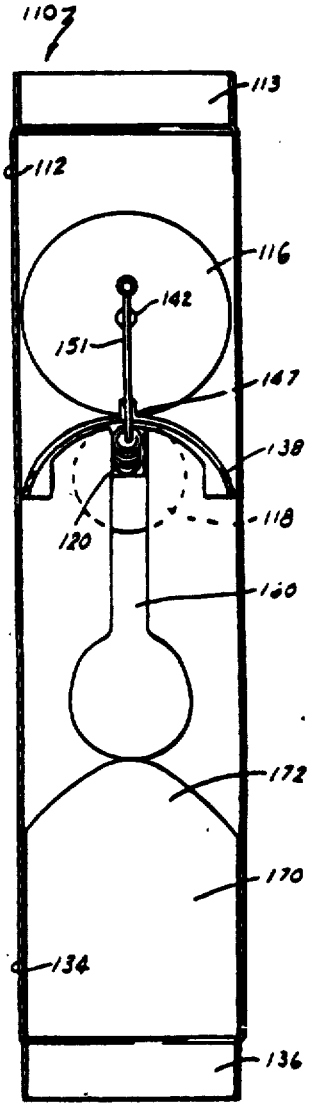
FIG. 7 is a side sectional view of the tank overfill valve taken along plane VII—VII in FIG. 6, shown with the slot closing collar in an open condition.

A second preferred embodiment is shown in FIGS. 6 and 7 and designated generally by the reference numeral 110. Tank overfill valve 110 is generally similar to tank overfill valve 110 with the exception of the modifications hereinafter noted. Overfill valve 110 includes a drop tube extension 112 having a crimped upper end 113 that allows extension 112 to be joined to the bottom of a conventional drop tube by welding or other conventional techniques. Extension 112 has sufficient length to reach the bottom of the liquid storage tank in which overfill valve 110 is to be installed. Tube extension 112 therefor reduces the production of vapors associated with splash loading of a liquid storage tank. Pivotally mounted within tube extension 112 is a curved valve plate 116 to which is mounted a weighted float 118 by a spring 120. Extension 112 also includes a discharge end 134 through which opens a discharge aperture 136. Secured within extension 112 is a valve seat 138 which is configured in a saddle-shaped configuration similar to that of valve seat 38. Curved plate 116 has the same saddle-shaped configuration as that of curved plate 16 and includes a drain aperture 142 therethrough.

Plate 116 is pivotally mounted on valve seat 138 by a hinge 144, FIG. 6. Hinge 144 includes an upstanding flange 145 on seat 138. The upper end of flange 145 is bent outward to form a hook that passes through a rectangular slot 147 in the lower end of curved plate 116. A spacer flange 149 adjacent slot 147 extends upward at a right angle from the upper face of curved plate 116 when curved plate 116 is in the closed condition. As shown in FIG. 6, when plate 116 is in an open condition spacer flange 149 spaces the lower end of curve plate 116 outward from the inner wall of tube extension 112 in the same manner as hinge 44. Spring 120 is connected to curved plate 116 by a connecting arm 151 that extends along the lower face of curved plate 116 and is riveted thereto.

As shown in FIG. 7, drop tube extension 112 includes a float receiving slot 160. Slot 160 extends downward adjacent hinge 144 and is configured slightly larger than the profile of float 118 and spring 120. Slot 160 is used as an assembly slot and permits spring 120 to be resiliently flexed downward so that spring 120 and float 118 pass through slot 160 in order to be positioned internally to tube extension 112. With float 160 positioned within tube extension 112 tank overfill valve 110 may be lowered down a storage tank casing and be positioned within the storage tank. When tube extension 112 has been lowered into the storage tank spring 120 will resiliently return to its relaxed position shown in FIG. 6 and dispose float 118 out of the fluid flow path through extension 112.

Slidably received within tube extension 112 beneath valve seat 138 is a slot closing collar 170. Collar 170 is a cylindrical tube or sleeve that abuts the inner perimeter of tube extension 112. Collar 170 is frictionally maintained in position along the length of extension 112. Collar 170 is used to block off slot 160 after tube extension 112 has been positioned within the storage tank. One side of collar 170 is raised into an arcuate, upstanding lip 172 and aligned with slot 160. A flexible line 174 is secured to the top of collar 170 opposite lip 172. After overfill valve 110 has been positioned within the tank, flexible line 174 is used to pull collar 170 upward until slot 160 is substantially covered. Upstanding lip 172 protrudes upward in an arch corresponding to the curve of valve seat 138 such that slot 160 is substantially closed. However, when closed slot 160 remains sufficiently open that spring connecting arm 151 may pass freely through the remaining opening as curved plate 116 opens and closes. After collar 170 has been shifted upward to the closed position, flexible line 174 is dropped down the center of tube extension 112, Alternatively, flexible line 174 is attached to the upper edge of collar 170 by a suitable conventional release mechanism that permits line 174 to be released and pulled up through tube extension 112.

Preferably, all the elements of overfill valves 10 and 110 are made from stainless steel, aluminum or other corrosion resistant material in order to prevent rusting. Overfill valves 10 and 110 may alternatively be coated to provide similar corrosion protection.

EMBODIMENTS OF FIGS. 8-15

A third preferred embodiment is shown in FIGS. 8 through 15 and designated generally by the reference numeral 210. Tank overfill valve 210 is generally similar to tank overfill valves 10 and 110, with the exception of the modifications hereinafter noted. Overfill valve 210 includes an extended drop tube or pipe 212 that is received within the tank and extends to the lower area of the tank. Pivotally mounted within tube 212 is a curved valve plate 216 on which a float 218 is mounted. Float 218 is mounted on plate 216 by a connector arm 220. Tube 212 includes a discharge end 234 (FIGS. 8-11), and secured within tube 212 is a valve seat 238. Valve seat 238 is also configured in a curved, saddle-shape configuration similar to that of valve seats 38 and 138. Valve plate 216 has a saddle-shape configuration that mates with valve seat 238, and also includes a drain aperture 242.

Figure 11:
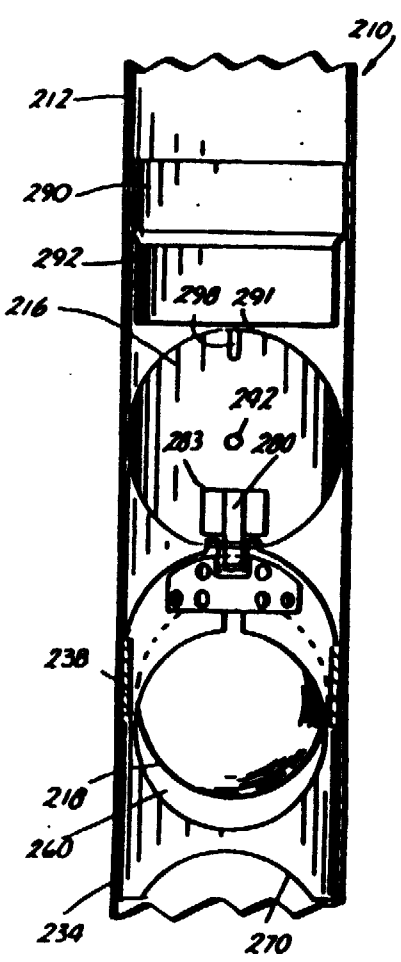
FIG. 11 is a fragmentary, side elevational view of the tank overfill valve of FIG. 8.
Figure 12:
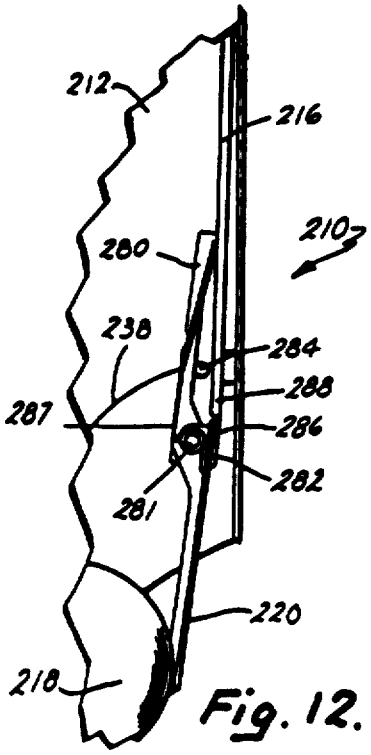
FIG. 12 is a schematic view of the tank overfill valve of FIG. 8 shown in a tank-inserting condition.

An access slot 260 opens through the side of drop tube 212 in order to permit float 218 and arm 220 to pass therethrough and align with drop tube 212. As will be seen in FIG. 10, arm 220 is a rigid arm that extends along a tangential line to spherical float 218, so that float 218 extends generally to the lower side of arm 220. This off-set positioning of float 218 permits float 218 to pass through access slot 260 with a reduced degree of pivoting by arm 220 (FIG. 12). A closing collar 270 (FIGS. 10–11) is slidably mounted within drop tube 212 and is frictionally held in position along tube 212. Collar 270 is pulled up to a closed position covering the majority of access slot 260 by a flexible line (not shown) after float 218 has shifted outside of drop tube 212.

Figure 13:
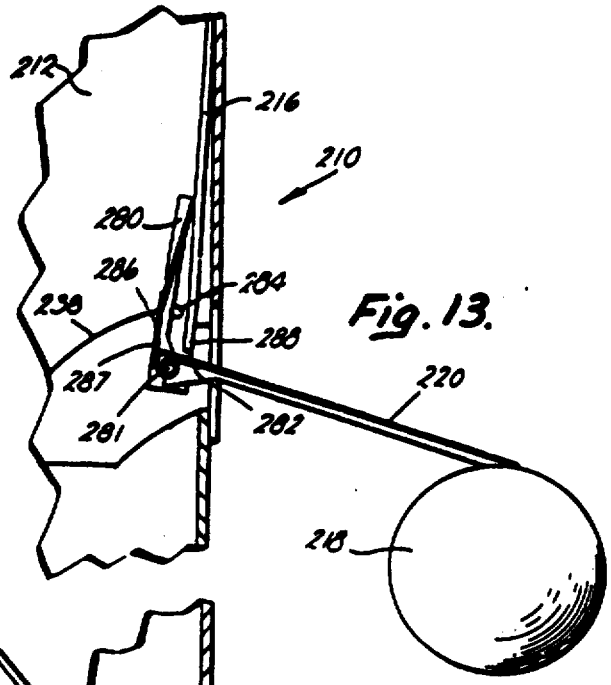
FIG. 13 is a sectional view of the tank overfill valve of FIG. 8, shown with the valve in a tank-inserted condition and the valve in an open position.

Float arm 220 is resiliently, pivotally mounted on plate 216. Arm 220 is mounted on drop tube 212 by a triggering assembly that includes a trigger element 280. Trigger element 280 has a generally rectangular body that extends normally upwardly from a lower pivotal hinge 281 when in the open or at-rest position shown in FIG. 13. Lower hinge 281 pivotally couples trigger element 280 to a pair of short extensions or tabs that depend from the lower end of flapper plate 216. Lower hinge 281 also pivotally couples trigger element 280 to the inboard end of float arm 220 (FIG. 13). A torsion spring 282 is located about hinge 281 and biases trigger element 280 and float arm 220 toward each other. Torsion spring 282 therefore biases arm 220 and float 218 out through access slot 260, and biases trigger element 280 toward an upright at-rest position shown in FIG. 3. The upper end of trigger element 280 widens out into a square plate 283 that provides an increased surface area that obstructs fluid flow when trigger element 280 is pivoted out into the fluid flowing through drop tube 212 as disclosed herein. Flapper valve 216 is pivotally mounted on valve seat 238 by an upper hinge 284 that is located above lower hinge 281. Effectively, float arm 220 and trigger element 280 pivot relative to valve plate 216 about lower hinge 281, while flapper valve plate 216 pivots relative to drop tube 212 about upper hinge 284. A wedge shaped land 285 (FIG. 9) on the face of valve plate 216 above trigger element 280 assists in producing a smooth flow of liquid over the upper edge of trigger element 280 and increases pressure to hold open plate 216 under high flow conditions.

Figure 15:
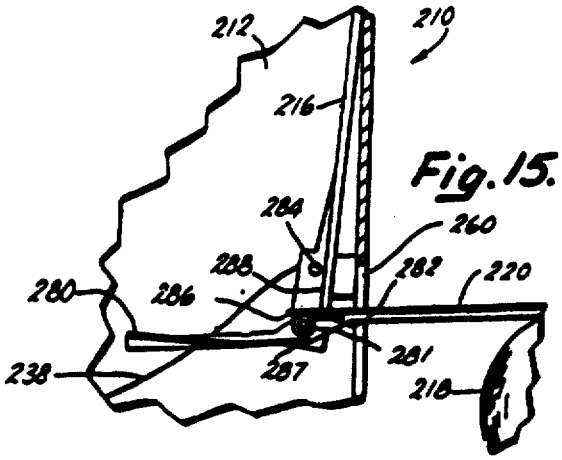
FIG. 15 is a sectional view of the tank overfill valve of FIG. 8, shown with the valve float raised in a filled position and the triggering element shifted to a triggering position.

As shown in FIG. 13, the upper end of float arm [218] *220* forms a float stop 286 that abuts the inside face of trigger element 280 when float 218 is raised. The lower end of trigger element 280 provides a triggering stop 287 that abuts the upper end of float arm 220 when trigger element 280 has been shifted into a triggering position, shown in FIG. 15. The lower edge of flapper valve plate 216 provides a plate stop 288 that abuts the upper face of float arm 220 when float arm 220 has been raised as shown in FIG. 15. Float stop 286 therefore permits arm 220 to pivot relative to trigger element 280 from an inserting position (FIG. 12) until a predetermined filled position is reached, and thereafter trigger element 280 is shifted by arm 220 as float 218 is raised. Triggering stop 287 permits trigger element 280 to pivot relative to arm 220 until trigger element 280 reaches a triggering position (FIG. 15), and thereafter trigger element 280 shifts arm 220. Plate stop 288 permits both trigger element 280 and arm 220 to pivot relative to flapper valve plate 216 until arm 220 contacts plate stop 288, so that flapper valve plate 216 is shifted toward the closed position (FIG. 16) as trigger element 280 is shifted through the triggering position.

Figure 10:
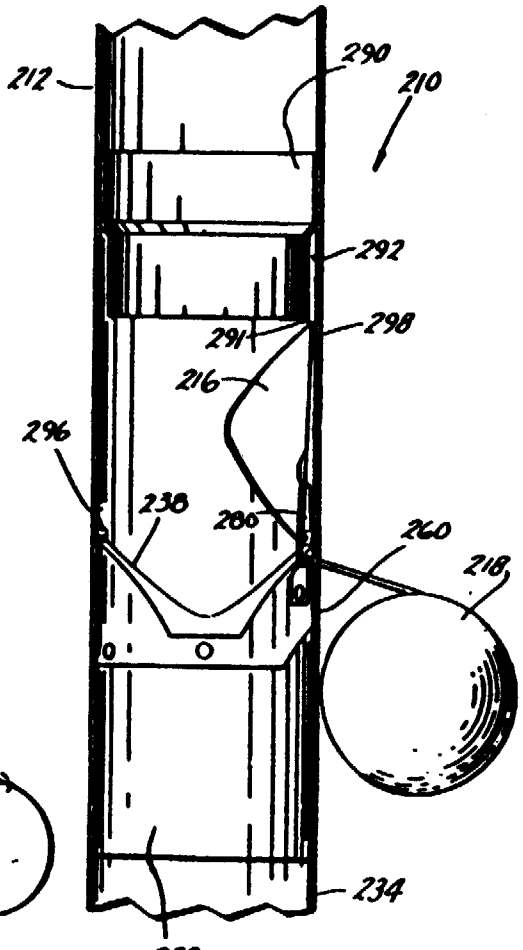
FIG. 10 is a fragmentary, front elevational view of the tank overfill valve of FIG. 8.
Figure 9:
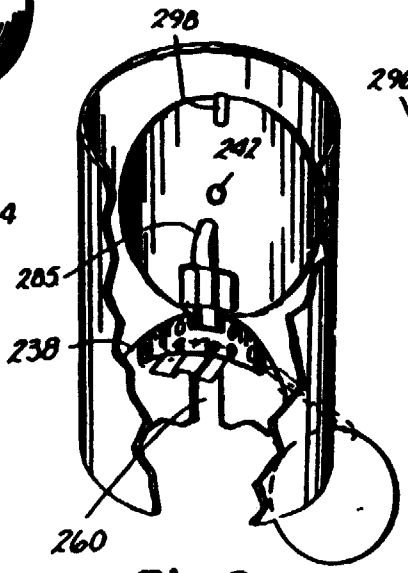
FIG. 9 is a fragmentary, perspective view of the tank overfill valve of FIG. 8 showing the inside of the valve.
Figure 8:
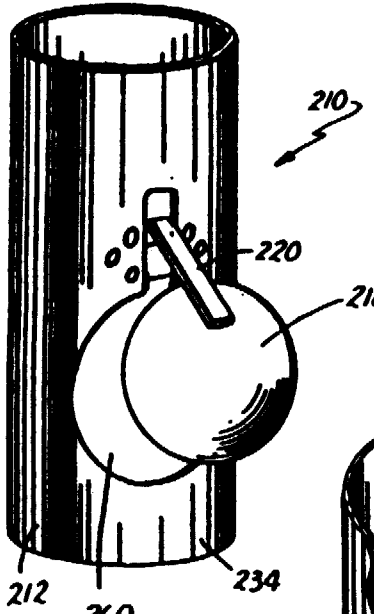
FIG. 8 is a fragmentary, perspective view of another tank overfill valve forming a third preferred embodiment of the device, shown with the valve in a tank-inserted condition with the valve in an open position.

Located above flapper valve 216 within drop tube 212 is a flow baffle 290 (FIGS. 10–11) that also forms an air cushion above seat 236. Flow baffle 290 is an annular ring that reduces the diameter of the orifice through drop tube 212 just above the upper edge 291 of flapper valve plate 216 when in the open position (FIGS. 10–11). Flow baffle 290 deflects the flow of liquid away from plate upper edge 291 and thus prevents liquid flow through drop tube 212 from causing an accidental closing of plate 216. Flow baffle 290 also reduces the force necessary for trigger element 280 to initially move flapper plate 216 toward a closed position, since the dynamic force of the liquid flow against flapper valve plate 216 is reduced.

The presence of air in the annular space 292 behind baffle 290 creates an air cushion that is compressible to reduce the water hammer effect produced upon the closing of plate 216. When plate 216 is quickly closed, any resulting hydraulic shock that would travel back up drop tube 212 contacts the air behind baffle 290. Since air is a compressible medium, the air operates as a damper on the shock effect.

Located on the upper surface of seat 238 opposite hinge 281 is a raised tab or land 296 (FIG. 10) that mates with a recess or slot 298 in plate 216 adjacent upper edge 291. When plate 216 is shifted to a closed position, land 296 is received in slot 298 in order to position plate 216 on seat 238. This reduces the stresses exerted on hinge 281 in holding plate 216 in position, and prevents plate 216 from slipping sideways along seat 238.

OPERATION

In order to mount drop tube 12 with overfill valve 10 within tank 30, spring 20 is manually bent downward until float 18a is located beneath discharge aperture 36 as shown in FIG. 3. Drop tube 12 is then slid down casing 14 without interference from float 18. When drop tube 12 is secured to the top of casing 14 in a conventional fashion, spring 20 returns float 18 and weight 52 to a normally open position.

In the open position plate 16 is generally vertically oriented with upper edge 46 resting against the inner wall of tube 12. Spring 20 depends to the side of tube 12 at a generally downward angle that holds float 18 out of the discharge zone beneath tube 12. As fluid flows through tube 12, the pressure exerted by the flowing fluid forces plate upper edge 46 outward against tube 12. This outward biasing of plate 16 is caused by an overcentering action resulting from the spacing of the lower edge of plate 16 from tube 12 by hinge 44.

As the level of liquid within the tank rises to discharge end 34, float 18 is raised as shown in FIGS. 1 and 2. The raising of float 18 causes plate 16 to pivot downward onto seat 38 and close discharge aperture 36. Hinge 44 provides some play between plate 16 and tube 12 so that plate 16 is permitted to seat itself correctly upon valve seat 38. While slowly being lifted, float 18 is required to overcome the pressure exerted against plate 16 by the fluid flowing through tube 12. When float 18 is raised sufficiently to force plate upper edge 36 away from the inner wall of tube 12, upper edge 46 of plate 16 is moved past its overcentered position. Thereafter plate 16 is very rapidly pivoted to a closed position by the fluid flowing through tube 12. The closing pressure of the fluid flowing through tube 12 raises float 18 above the upper level 22 of the liquid. When plate 16 shuts, delivery from the truck is halted.

Control drain aperture 42 permits the standing head of liquid within tube 12 to drain into tank 30 at a controlled rate. Drain aperture 42 bleeds off the standing head at a preferred rate of less than two to three gallons per minute. When tube 12 has drained sufficiently that the weight of float 18 and weight 52 overcome the remaining fluid head in tube 12, plate 16 will be biased open and permit the remainder of the fluid to drain into tank 30. If tank 30 is filled in such a manner as to raise liquid level 22 enough to hold float 18 in a constantly closed condition (FIGS. 1 and 2), the tank fill lines can be drained into tank 30 by loosening the fill line coupling with the top of tube 12 and casing 32. The liquid will then run down annular space 32. Thereafter, as liquid is removed from tank 30 and fluid level 22 lowers, any standing head remaining in tube 12 will drain through aperture 42 and plate 16 will return to its normally open position.

Since neither plate 16 or float 18 are positioned within discharge zone 37 beneath discharge end 34, the fluid level within tank 30 may be gauged in a conventional fashion by lowering a pole down through tube 12. The pole will not be obstructed by objects along its path and may be lowered to the bottom of tank 30.

Valve 110 in drop tube 112 is positioned in the same manner as valve 10 above. However, collar 170 is first slid downward to an open position and spring 120 with float 118 attached thereto is flexed through slot 160. When tube extension 112 with valve 110 is positioned within the storage tank, spring 120 returns float 118 to its at-rest open position. Flexible line 174 is used to draw collar 170 up to a closed position shown in FIG. 6. Thereafter, value 110 operates in the same manner as value 10 described above.

Figure 16:
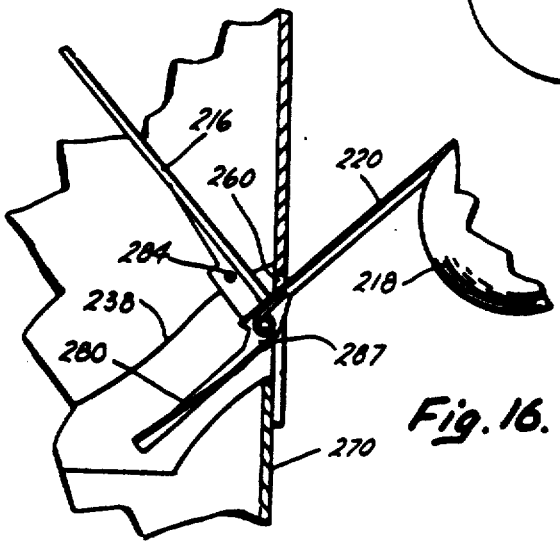
FIG. 16 is a sectional view of the tank overfill valve of FIG. 8, shown with the valve closure element being shifted toward the closed position.
Figure 14:
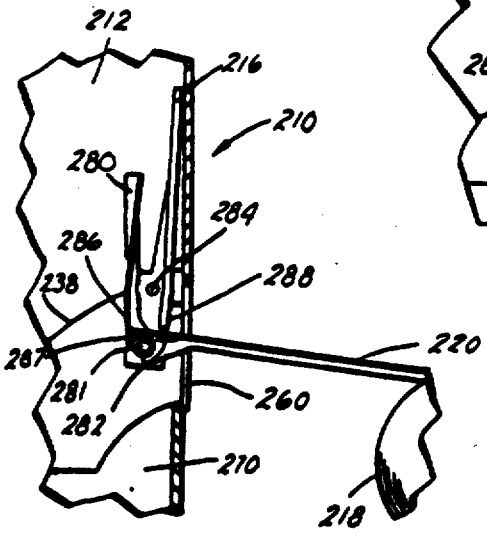
FIG. 14 is a sectional view of the tank overfill valve of FIG. 8, shown with the valve float raised in a filled position and the triggering element shifted away from an at-rest position.

For the insertion of value 210 into a tank, float 218 and arm 220 are shifted into alignment with drop tube 212 so that float 218 is received through access slot 260 as shown in FIG. 12. When valve 210 is in place, torsion spring 282 biases float arm 220 and float 218 out of drop tube 212 (FIG. 13), and trigger element 280 is biased toward an at-rest position. The weight of float 218 causes trigger element 280 to pivot flapper plate 216 into the open position shown in FIG. 13. When the tank is filled, float 218 will raise to a filled position, causing float stop 286 to abut the side of trigger element 280 and shift trigger element 280 out into the flow of liquid through drop tube 212 (FIG. 14). Trigger element 280 is thus shifted by float 218 toward the triggering position shown in FIG. 15. Once trigger element 280 has been shifted sufficiently, the flow of liquid through drop tube 212 causes trigger element 280 to pivot quickly into the triggering position (FIG. 15) with triggering stop 287 abutting float arm 220. The increased surface area of plate 283 increases the force exerted by trigger element 280 against arm 220. Trigger element 280 thereafter continues to be pivoted by the fluid flow and raises float arm 220 until plate stop 288 abuts the upper side of float arm 220. The force generated by the fluid flow against trigger element 280 causes flapper valve plate 216 to be shifted toward the closed position (FIG. 16). Once flapper valve plate 216 is moved sufficiently, the flow of liquid through drop tube 212 quickly forces flapper valve plate 216 into a closed condition. Trigger element 280 is therefore an initiator element that initiates or triggers the movement of flapper valve plate 216 toward the closed position.

It is to be remembered that the above is merely a description of the preferred embodiment and that various modifications or improvements may be made without departing from the spirit of the invention disclosed therein. The scope of the protection afforded is to be determined by the claims which follow and the breadth of interpretation which the law allows.

The embodiments of the invention in which an exclusive property or privelege is claimed are as follows.

1. An overfill valve for use in liquid storage tanks having *a casing with* an inlet orifice, comprising:

an inlet pipe configured for receipt in said storage tank inlet orifice, *said inlet pipe having an upper inlet and a lower discharge end, said upper inlet and said lower discharge end being substantially aligned such that a gauging pole may be lowered therethrough;* a closure member mounted [on] *within* said inlet pipe *so as to be disposed beneath said inlet orifice when said overfill valve is mounted on said storage tank and said closure member mounted* to be selectively shiftable between a closed position and an open position;

float means *proximate said closure member and* coupled to said closure member such that said closure member moves from said open position to said closed position as said float means is raised; and access means *disposed between said inlet and said discharge end* for allowing the movement of at least a portion of said float means from the exterior of said pipe to the interior of said pipe, coupling means between said float means and said closure member for enabling said float means to align with said inlet pipe sufficient for insertion of said inlet pipe in said storage tank inlet orifice.

2. The overfill valve of claim 1, wherein:

said float means includes a float on a connector arm, said connector arm resiliently coupled to said closure member.

3. The overfill valve of claim 2, wherein:

said float is pivotally mounted on said inlet pipe, said pivotal mounting of said float including a spring element biasing said float away from alignment with said inlet pipe.

4. The overfill valve of claim 3, wherein said connector arm comprises said spring element.

5. [The overfill valve of claim 3, wherein:] *An overfill valve for use in liquid storage tanks having an inlet orifice, comprising:*

*an inlet pipe configured for receipt in said storage tank inlet orifice;*

*a closure member mounted on said inlet pipe to be selectively shiftable between a closed position and an open position;*

*float means coupled to said closure member such that said closure member moves from said open position to said closed position as said float means is raised;*

*said float means including a float on a connector arm, said connector arm resiliently coupled to said closure member;*

*said float is pivotally mounted on said inlet pipe, said pivotal mounting of said float including a spring element biasing said float away from alignment with said inlet pipe;* said connector arm is generally rigid, and said spring element is disposed adjacent said pivotal mounting of said float[.] *; and*

*access means for allowing the movement of at least a portion of said float means from the exterior of said pipe to the interior of said pipe, coupling means between said float means and said closure member for enabling said float means to align with said inlet pipe sufficient for insertion of said inlet pipe in said storage tank inlet orifice.*

6. The overfill valve of claim 2, wherein:

said float and said closure member are pivotally mounted on said inlet pipe; and a triggering element pivotally mounted in said inlet pipe to pivot from an at-rest position to a triggering position in the flow of liquid through said inlet pipe, said triggering element coupled to said float and said closure member such that said triggering element pivots from said at-rest position toward said triggering position as said float is raised and said closure member is pivoted from said open position toward said closed position as said triggering element pivots through said triggering position.

7. The overfill valve of claim 6, further comprising:

a spring mounted between said connector arm and said triggering element.

8. The overfill valve of claim 1, wherein:

said access means includes an assembly aperture in the side of said inlet pipe.

9. The overfill valve of claim 8, wherein:

said access means includes covering means for selectively substantially closing said assembly aperture.

10. The overfill valve of claim 1, wherein:

said inlet pipe includes a curved inner surface; and said closure member has a saddle-shaped curved configuration that extends at least partially about said inlet pipe inner surface when said closure member is in said open position.

11. The overfill valve of claim 1, wherein:

said inlet pipe includes an inner surface about a liquid flow zone;

means for triggering said closure member to shift said closure member from said open position toward said closed position when said float means is raised to a preselected full level, said triggering means including a triggering element movable between an at-rest position with said triggering element adjacent said inner surface and a triggering position with said triggering element moved into said liquid flow zone; and said float coupled to said triggering element to move said triggering element from said at-rest position toward said triggering position when said float is raised to a preselected filled level, said triggering element coupled to said closure member to move said closure member from said open position toward said closed position as said triggering element moves through said triggering position.

12. The overfill valve of claim 1, further comprising:

a fluid flow baffle located within said inlet pipe above said closure member.

13. An overfill valve for use in liquid storage tanks having *a casing with* an inlet orifice, comprising:

an inlet pipe configured for receipt in said storage tank inlet orifice;

a closure member mounted on said inlet pipe *so as to be disposed beneath said inlet orifice when said overfill valve is mounted on said storage tank and said closure member mounted* to be selectively shiftable between a closed position and an open position;

a float element resiliently mounted with said closure member such that said closure member moves from said open position to said closed position as said float element is raised;

an assembly opening in the side of said inlet pipe, said assembly opening positioned to provide said float element with the ability for at least partial reception therethrough to permit insertion of said inlet pipe in said storage tank inlet orifice; and said resilient mounting of said float element biases said float element out of said inlet pipe.

14. The overfill valve of claim 13, further comprising:

means for initiating the movement of said closure from said open position to said closed position, said initiating means including a triggering element coupled to said closure member and said float element, said float element shifting said triggering element into a flow of liquid through said inlet pipe when said float element is raised to a preselected filled level and said triggering element initiates movement of said closure member from said open to said closed position when said triggering element is shifted by said float element.

15. The overfill valve of claim 14, wherein:

said inlet pipe includes a curved inner surface; and said closure member is a saddle-shaped, curved plate that is adapted to extend along said inlet pipe inner surface when said closure member is in said open position.

16. The overfill valve of claim 15, wherein:

said float element, said closure member and said triggering element are pivotally mounted in said inlet pipe; and a spring mounted between said triggering element and said float element.

17. The overfill valve of claim 16, further comprising:

covering means for substantially closing said assembly opening when said float element is not received therethrough.

18. The overfill valve of claim 13, further comprising:

covering means for substantially closing said assembly opening when said float element is not received therethrough.

19. The overfill valve of claim 13, further comprising:

a triggering element pivotally mounted in said inlet pipe to pivot from an at-rest position to a triggering position in the flow of liquid through said inlet pipe, said triggering element coupled to said float and said closure member such that said triggering elements pivots from said at-rest position toward said triggering position as said float is raised and said closure member is pivoted from said open position toward said closed position as said triggering element pivots through said triggering position; and a spring mounted to pivotally bias said triggering element and said float element toward one another.

20. The overfill valve of claim 19, wherein:

said triggering element includes a first stop thereon engaged by said float when said float is raised to a preselected filled level; and said closure member includes a second stop thereon engaged by one of said float and said triggering element when said triggering element reaches said triggering position.

21. An overfill valve for use in liquid storage tanks *having a casing with an inlet orifice*, comprising:

an inlet pipe *having an aligned inlet and outlet such that a gauging pole may be lowered therethrough;* a closure member mounted on said inlet pipe *so as to be disposed beneath said inlet orifice when said overfill valve is mounted on said storage tank and said closure member mounted* to be selectively shiftable between a closed position in which a chamber is defined upstream of said closure member and an open position;

means for controlled draining of said chamber when said closure member is in said closed position; and means for automatically shifting said closure member from said open position to said closed position when a liquid level rises to a preselected full level and for automatically shifting said closure member from said closed position to said open position when a liquid level falls below a preselected filling level, *said automatic shifting means including a float mounted on said inlet pipe and means to permit said float to selectively shift so as to be substantially within the outer perimeter of said inlet pipe,* whereby when said overfill valve is installed in a tank to be filled, said overfill valve will selectively close said inlet pipe when the liquid level reaches said preselected full level to prevent overfilling of the tank and liquid that collects upstream of said closure member when it is closed will drain into the tank through said controlled draining means and allow said closure member to open.

22. An overfill valve for use in liquid storage tanks, comprising:

an inlet pipe;

a closure member mounted on said inlet pipe to be shiftable between a closed position and an open position; and means for automatically shifting said closure member from said open position to said closed position when a liquid level rises to a preselected full level and for automatically shifting said closure member from said closed position to said open position when the liquid level falls below a preselected filling level, said automatic shifting means including an initiator element *separate from said closure member and* coupled with said closure [element] *member,* said initiator element being shifted into the flow of liquid through said inlet pipe when said liquid level reaches said full level to initiate the shifting of said closure member from said open position to said closed position.

23. The overfill valve of claim 22, wherein:

said initiator element is pivotally coupled to said closure member; and said automatic shifting means includes means for positively engaging said initiator element relative to said closure member at an engagement position for movement of said closure member by said initiator element, such that said initiator element pivots relative said closure member into the flow of liquid through said inlet pipe until said engagement position is reached, and said initiator element shifts said closure member toward said closed position thereafter.

24. The overfill valve of claim 23, further comprising:

a float coupled with said initiator element and said closure member; and said positive engaging means including a first stop on said initiator element positioned for engagement by said float when said float is raised to an initiation level, and a second stop on said closure member positioned for engagement by one of said initiator element and said float when said initiator element is moved to said engagement position.

25. The overfill valve of claim 24, wherein:

said positive engaging means includes a third stop on said float positioned for engagement by said initiator element when said initiator element is moved to said engagement position, and said float engages said second stop.

26. The overfill valve of claim 25, further comprising:

means for pivotally biasing said initiator element and said float toward one another.

27. The overfill valve of claim 26, wherein:

said inlet pipe includes an access aperture therein positioned to provide for the receipt of said float therethrough, said pivotal biasing means biasing said float out of said inlet pipe.

28. The overfill valve of claim 27, wherein:

said inlet pipe includes a curved inner surface; and said closure member has a saddle-shaped curved configuration that extends at least partially about said inlet pipe inner surface when said closure member is in said open position.

29. The overfill valve of claim 23, wherein:

said inlet pipe includes an inner surface;

said closure member is hinged in said inlet pipe to extend from said pivotal coupling generally along said inner surface when in said open position; and said initiator element extends from said pivotal coupling generally adjacent said closure member when in an at-rest position.

30. The overfill valve of claim 22, wherein:

said automatic shifting means includes a float coupled with said initiator element, said float shifting said initiator element into the flow of liquid through said inlet pipe when the liquid level reaches said full level.

31. The overfill valve of claim 22, wherein:

said inlet pipe includes a curved inner surface; and said closure member has a saddle-shaped curved configuration that extends at least partially about said inlet pipe inner surface when said closure member is in said open position.

32. The overfill valve of claim 22, further comprising:

a fluid flow baffle, located within said inlet pipe above said closure member.

33. An overfill valve for use in liquid storage tanks, comprising:

an inlet pipe;

a closure member pivotally mounted on said inlet pipe to be pivotal between a closed position and an open position;

a triggering element pivotally mounted on said inlet pipe to be pivotal between an at-rest position and a triggering position disposed in the flow of liquid through said inlet pipe;

a float element mounted on said inlet pipe; and means for coupling said closure member, said triggering element and said float element so that said float element pivots said triggering element from said at-rest position toward said triggering position when said float is raised to a preselected full level, and said triggering element pivots said closure member from said open position toward said closed position when said triggering element pivots through said triggering position.

34. The overfill valve of claim 33, wherein:

said float element is pivotally coupled to said triggering element in order to pivot relative thereto, said triggering element including a first stop engaged by said float when said float is raised to said full level, said triggering element being pivoted by said float thereafter; and said float element and said float are pivotally coupled to said closure member in order to pivot relative thereto, said closure member including a second stop engaged by one of said triggering element and said float element when said triggering element is pivoted to said triggering position, said closure member being pivoted by said triggering element thereafter.

35. The overfill valve of claim 34, wherein:

said float element includes a third stop engaged by said triggering element when said triggering element is pivoted to said triggering position, and said float engages said second stop.

36. The overfill valve of claim 35, further comprising:

means for biasing said triggering element from said triggering position to said at-rest position.

37. The overfill valve of claim 36, wherein:

said inlet pipe includes an assembly aperture therein, and said first stop and said third stop are disposed to provide sufficient relative pivoting between said triggering element and said float element for said float element to be at least partially received in said assembly aperture.

38. The overfill valve of claim 37, wherein:

said inlet pipe includes a curved inner surface; and said closure member has a saddle-shaped curved configuration that extends at least partially about said inlet pipe inner surface when said closure member is in said open position.

39. The overfill valve of claim 33, further comprising:

a fluid flow baffle mounted within said inlet pipe above said closure member.

40. A method for filling a liquid storage tank having a fill conduit extending from the tank, comprising:

providing a drop conduit;

mounting a closure member on said drop conduit so as to be selectively shiftable between a closed position and an open position;

resiliently connecting float means to said drop conduit by means adapted to shift said closure member to said closed position from said open position; said float means being positioned to provide a normally unobstructed opening through said drop conduit;

inserting said drop conduit into said fill conduit to create a vapor outlet between said drop and fill conduits; said float means being resiliently urged toward said drop conduit while said drop conduit is being inserted;

supporting said drop conduit within said fill conduit such that said float will shift said closure member from said open to said closed position when the liquid level reaches a preselected level in said tank which creates a free space above said liquid in said tank; and filling said tank to said preselected level through said drop conduit while allowing vapors to pass through said vapor outlet.

41. The method of claim 40, further comprising:

mounting a triggering element on said drop conduit so as to be selectively shiftable between an at-rest position and a triggering position disposed in said normally unobstructed opening through said drop conduit;

coupling said float means to said triggering element by means adapted to shift said triggering element from said at-rest position toward said triggering position as said float means is raised; and said resiliently connecting float means to said drop conduit step includes coupling said triggering element to said closure member so as to shift said closure member from said closed position toward said open position as said triggering element is shifted through said triggering position.

42. An overfill valve for use in liquid storage tanks *having a casing with an inlet orifice*, comprising:

an inlet pipe having *a generally vertically aligned inlet end and* a discharge end, *said discharge end adapted to be connected to a drop tube extension of a length sufficient to depend to a lower region of said tank;* a closure member mounted on said inlet pipe *so as to be disposed beneath said inlet orifice when said overfill valve is mounted on said storage tank and said closure member mounted* to be selectively shiftable between a closed position and an open position;

said closure member having controlled drain means associated therewith; [and]

means for automatically shifting said closure member from said open position to said closed position when a liquid level rises to said discharge end and for automatically shifting said closure member from said closed position to said open position when a liquid level is beneath said discharge end, *said automatic shifting means having an aligned insertion position in which said overfill valve is provided with the ability to be lowered into a tank and an inserted position in which* said automatic shifting means [being] *is* disposed away from said discharge end, whereby when said overfill valve is installed in a tank to be filled *with said drop tube extension connected to said discharge end*, said overfill valve will *remain open as liquid rises along said drop tube extension and* selectively close said inlet pipe when the liquid level reaches a preselected level to prevent overfilling of the tank, and any liquid that collects above said closure member when it is closed will drain into the tank through said controlled drain means and allow said closure member to open; *and*

*said inlet pipe, said closure member and said automatic shifting means being configured and disposed so as to permit a gauging pole to be lowered through said overfill valve.*

43. The overfill valve of claim 42, wherein:

said shifting means includes [said] *a* float and [said] *a* connector being weighted, and said connector is resilient.

44. The overfill valve of claim 42, wherein:

said closure member is a valve plate pivotally mounted within said pipe by a hinge located at one end of said valve plate, said hinge spacing said valve plate one end from said inner wall and said valve plate extending generally upward from said hinge when said closure member is in an open position such that the flow of liquid through said pipe biases said valve plate against said inner wall when said closure member is in an open position.

45. An overfill valve for use in liquid storage tanks, comprising:

a liquid fill pipe having a lower end through which a discharge aperture passes and an inner wall, said inner wall defining an inner perimeter;

a valve face element movably mounted in said pipe to selectively move between an open position and a closed position, said valve face element including a flapper plate mounted to said inner wall of said pipe by a hinge, said flapper plate configured in a curved oval so as to block said discharge aperture when in said closed position and to extend generally around a portion of said inner perimeter of said pipe when in said open position, said hinge spacing said flapper plate from said wall such that fluid flow through said discharge aperture selectively maintains said flapper plate in said open position;

a valve seat extending inwardly from said inner wall of said pipe, said valve seat forming a saddle shaped configuration corresponding to said flapper plate;

said flapper plate including a drain aperture therethrough;

a float coupled to said valve face element by a resilient [float] connector, said [float] connector extending from said valve face element such that said valve face element moves from an open position to a closed position as said float is raised;

a weight coupled to said valve face element by [a] *said* resilient [weight] connector, said [weight] connector extending from said valve face element such that said valve face element moves from a closed position into an open position as said weight is lowered;

said [float connector and said weight] connector being a single coupling element, said spring element extending generally to the side of said pipe so as to dispose both said float and said weight outside of the path of fluid flow through said discharge aperture;

said fill pipe including an assembly slot therethrough, said assembly slot being configured and disposed to provide for the passage of said float, [said float connector,] said weight and said [weight] connector therethrough; and means for substantially closing said assembly slot after said overfill valve has been positioned within a liquid storage tank, whereby said overfill valve will close when a liquid level raises said float sufficiently and said weight will urge said overfill valve into a normally open condition, and said float and said weight may be resiliently moved away from obstructions either external or internal to said pipe.

46. The overfill valve of claim 45, wherein:

said means for substantially closing said assembly slot includes a collar longitudinally slidable along said fill pipe to selectively, substantially block said assembly slot.

47. An overfill valve for use in liquid storage tanks, comprising:

a liquid fill pipe having a lower end through which a discharge aperture passes *and an upper end through which an inlet aperture passes, said inlet aperture generally vertically aligned with said discharge aperture;* a valve face element movably mounted in said pipe to selectively move between an open position and a closed position;

a float coupled to said valve face element by a resilient [float] connector, said [float] connector extending from said valve face element such that said valve face element moves from an open position to a closed position as said float is raised;

a weight coupled to said valve face element by [a] *said* resilient [weight] connector, said [weight] connector extending from said valve face element such that said valve face element moves from a closed position into an open position as said weight is lowered;

said fill pipe including an assembly slot therethrough, said assembly slot being configured and disposed to provide for the passage of said float, [said float connector,] said weight and said [weight] connector therethrough; and means for substantially closing said assembly slot after said overfill valve has been positioned within a liquid storage tank, whereby said overfill valve will close when a liquid level raises said float sufficiently and said weight will urge said overfill valve into a normally open condition, and said float and said weight may be resiliently moved away from obstructions either external or internal to said pipe.

48. The overfill valve of claim 47, wherein:

said means for substantially closing said assembly slot includes a collar longitudinally slidable along said fill pipe to selectively, substantially block said assembly slot.

49. The overfill valve of claim 47, wherein:

said float includes said weight.

50. An overfill valve for use in liquid storage tanks, comprising:

a liquid fill pipe having a lower end through which a discharge aperture passes;

a valve face element movably mounted in said pipe to selectively move between an open position and a closed position;

a float coupled to said valve face element by a spring coupling element, said spring coupling element extending from said valve face element such that said valve face element moves from an open position to a closed position as said float is raised;

a weight coupled to said valve face element by said spring coupling element, said spring coupling element extending from said valve face element such that said valve face element moves from a closed position into an open position as said weight is lowered;

said spring coupling element extending generally to the side of said pipe so as to dispose said float and said weight outside of the path of fluid flow through said discharge aperture;

said fill pipe including an assembly slot therethrough, said assembly slot being configured and disposed to provide for the passage of said spring coupling element and said float therethrough when said spring coupling element is resiliently bent toward said fill pipe; and means for substantially closing said assembly slot after said overfill valve has been positioned within a liquid storage tank, whereby said overfill valve will close when a liquid level raises said float sufficiently and said weight will urge said overfill valve into a normally open condition, and said float and said weight may be resiliently moved away from obstructions either external or internal to said pipe.

51. The overfill valve of claim 50, wherein:

said means for substantially closing said assembly slot includes a collar longitudinally slidable along said fill pipe to selectively, substantially block said assembly slot.

52. The overfill valve of claim 50, wherein:

said float includes said weight.

*53. An overfill valve for use in liquid storage tanks having a casing with an inlet orifice, comprising:*

*an inlet pipe configured for receipt in said storage tank inlet orifice, said inlet pipe having an outer perimeter, an upper inlet and a lower discharge end, said upper inlet and said lower discharge end being substantially aligned such that a gauging pole may be lowered therethrough;*

*a closure member mounted within said inlet pipe so as to be disposed beneath said inlet orifice when said overfill* valve is mounted on said storage tank and said closure member mounted to be selectively shiftable between a closed position and an open position;

a float coupled to said closure member such that said closure member moves from said open position to said closed position as said float is raised; and access means disposed between said inlet and said discharge end for allowing the movement of at least a portion of said float from the exterior of said pipe outer perimeter to within said pipe outer perimeter and enable said float to align with said inlet pipe sufficient for insertion of said inlet pipe in said inlet orifice.

54. The overfill valve of claim 53, further comprising:

a controlled drain associated with said closure member, whereby when said closure member is in a closed position liquid collected above said closure member will drain into said storage tank through said controlled drain.

55. An overfill valve for use in liquid storage tanks having a casing with an inlet orifice, comprising:

an inlet pipe configured for receipt in said storage tank inlet orifice, said inlet pipe having an outer perimeter, an upper inlet and a lower discharge end, said upper inlet and said lower discharge end being substantially aligned such that a gauging pole may be lowered therethrough;

a closure member mounted within said inlet pipe so as to be disposed beneath said inlet orifice when said overfill valve is mounted on said storage tank and said closure member mounted to be selectively shiftable between a closed position and an open position;

a float coupled to said closure member such that said closure member moves from said open position to said closed position as said float is raised; and access means disposed between said inlet and said discharge end for allowing the movement of substantially all of said float from the exterior of said pipe outer perimeter to within said pipe outer perimeter and enable said float to align with said inlet pipe sufficient for insertion of said inlet pipe in said storage tank inlet orifice.

56. The overfill valve of claim 55, further comprising:

a controlled drain associated with said closure member, whereby when said closure member is in a closed position liquid collected above said closure member will drain into said storage tank through said controlled drain.

57. An overfill valve for use in liquid storage tanks having a casing with an inlet orifice, comprising:

an inlet pipe configured for receipt in said storage tank inlet orifice, said inlet pipe having an outer perimeter, an upper inlet and a lower discharge end, said upper inlet and said lower discharge end being substantially aligned such that a substantially linear element may be lowered therethrough;

a closure member mounted within said inlet pipe so as to be disposed beneath said inlet orifice when said overfill valve is mounted on said storage tank and said closure member mounted to be selectively shiftable between a closed position and an open position;

a float coupled to said closure member such that said closure member moves from said open position to said closed position as said float is raised; and said inlet pipe having an access zone disposed between said inlet and said discharge end and configured to allow the movement of at least a portion of said float from the exterior of said pipe outer perimeter to within said pipe outer perimeter and enable said float to align with said inlet pipe sufficient for insertion of said inlet pipe in said storage tank inlet orifice.

58. An overfill valve for use in liquid storage tanks having a casing with an inlet orifice, comprising:

an inlet pipe configured for receipt in said storage tank inlet orifice, said inlet pipe having an outer perimeter, an upper inlet and a lower discharge end, said upper inlet and said lower discharge end being substantially aligned such that a gauging pole may be lowered therethrough;

a closure member mounted within said inlet pipe so as to be disposed beneath said inlet orifice when said overfill valve is mounted on said storage tank and said closure member mounted to be selectively shiftable between a closed position and an open position;

a float resiliently coupled to said closure member such that said closure member moves from said open position to said closed position as said float is raised;

said inlet pipe having an access zone disposed configured to allow the movement of substantially all of said float from the exterior of said pipe outer perimeter to within said pipe outer perimeter and enable said float to align with said inlet pipe sufficient for insertion of said inlet pipe in said storage tank inlet orifice;

said resilient coupling of said float resiliently urging said float out of said access zone.

59. An overfill valve for use in liquid storage tanks having a casing with an inlet orifice, comprising:

an inlet pipe configured for receipt in said storage tank inlet orifice;

a closure member mounted within said inlet pipe so as to be disposed beneath said inlet orifice when said overfill valve is mounted on said storage tank and said closure member mounted to be selectively shiftable between a closed position and an open position;

a float element resiliently mounted with said closure member such that said closure member moves from said open position to said closed position as said float element is raised;

an assembly recess in the side of said inlet pipe, said assembly recess positioned to provide said float element with the ability for at least partial reception therein to permit insertion of said inlet pipe in said storage tank inlet orifice;

said resilient mounting of said float element biasing said float element out of said inlet pipe.

60. An overfill valve for use in liquid storage tanks having a casing with an inlet orifice, comprising:

an inlet pipe configured for receipt in said storage tank inlet orifice;

a closure member mounted within said inlet pipe so as to be disposed beneath said inlet orifice when said overfill valve is mounted on said storage tank and said closure member mounted to be selectively shiftable between a closed position and an opened position;

a float element resiliently mounted with said closure member such that said closure member moves from said open position to said closed position as said float element is raised, said closure member proximate said float element, and in said open position said closure member and said float element providing a substantially unobstructed linear passage through said inlet pipe;

an assembly recess in the side of said inlet pipe, said assembly recess positioned to provide said float element with the ability for at least partial reception

*therein to permit insertion of said inlet pipe in said storage tank inlet orifice;*

*said resilient mounting of said float element biasing said float element away from said inlet pipe.*

*61. An overfill valve for use in liquid storage tanks, comprising:*

*an inlet pipe having an outer perimeter, an upper inlet and a lower discharge, said upper inlet and said lower discharge being substantially aligned such that a substantially linear element may be lowered therethrough;*

*a closure member mounted within said inlet pipe so as to be disposed within said storage tank when said overfill valve is mounted on said storage tank, and said closure member mounted to be selectively shiftable between a closed position and an open position;*

*a float element mounted with said closure member such that said closure member moves from said open position to said closed position as said float element is raised;*

*access means disposed between said upper inlet and said lower discharge for selectively allowing the movement of at least some region of said float element to within said inlet pipe outer perimeter;*

*said closure member and said float element disposed when in said open position to permit the passage of a gauging pole down through said inlet pipe, whereby said access mean allows said float element to be moved at least partially within said inlet pipe outer perimeter for mounting said overfill valve on said storage tank and a gauging pole may be lowered through said overfill valve when in an open position to gauge the liquid level in said storage tank.*

*62. The overfill valve of claim 61, wherein:*

*said float element is resiliently mounted with said closure member to resiliently bias said float element toward the outside of said inlet pipe outer perimeter.*

*63. An overfill valve for use in liquid storage tanks having a casing with an inlet orifice, comprising:*

*an inlet pipe having an outer perimeter;*

*a closed member mounted within said inlet pipe so as to be disposed beneath said inlet orifice when said overfill valve is mounted on said storage tank and said closure member mounted to be selectively shiftable between a closed position and an open position;*

*said closure member having a controlled drain means associated therewith;*

*means for automatically shifting said closure member between said open position and said closed position, said automatic shifting means including a float resiliently coupled to said closure member so as to shift said closure member toward said closed position as said float is raised;*

*access means for allowing the resilient movement of at least some region of said float to within said inlet pipe outer perimeter, with said float being resiliently biased toward the outside of said inlet pipe outer perimeter.*

* * * * *

UNITED STATES PATENT AND TRADEMARK OFFICE

CERTIFICATE OF CORRECTION

PATENT NO. : RE: 33,555

DATED : March 19, 1991

INVENTOR(S) : Roger A. Draft

It is certified that error appears in the above-indentified patent and that said Letters Patent is hereby corrected as shown below:

Column 5, Line 31
"valve 110" should be --valve 10--

Column 7, Line 23
"Fig. 3" should be --Fig. 13--

Column 9, Line 26
"value" should be --valve--

Column 9, Lines 26, 27, 28
"value" should be --valve--

Column 12, Claim 19, Line 40
"elements" should be --element--

Column 16, Claim 42, Line 21
"overfill" should be --overfill[ed]--

Column 17, Claim 45, Line 20
"single" should be --spring--

UNITED STATES PATENT AND TRADEMARK OFFICE

CERTIFICATE OF CORRECTION

PATENT NO. : RE: 33,555

DATED : March 19, 1991

INVENTOR(S) : Roger A. Draft

It is certified that error appears in the above-indentified patent and that said Letters Patent is hereby corrected as shown below:

Column 22, Claim 63, Line 12
"closed" should be --closure--

Signed and Sealed this

Twenty-seventh Day of September, 1994

*Attest:*

Bruce Lehman

BRUCE LEHMAN

*Attesting Officer*

*Commissioner of Patents and Trademarks*